United States Patent [19]
Washizu et al.

[11] Patent Number: 5,007,386
[45] Date of Patent: Apr. 16, 1991

[54] INTAKE SYSTEM FOR AUTOMOTIVE ENGINE

[75] Inventors: Takehiro Washizu; Tsutomu Nagamatsu, both of Iwata, Japan

[73] Assignee: Yamaha Hatsudoki Kabushiki Kaisha, Iwata, Japan

[21] Appl. No.: 483,103

[22] Filed: Feb. 22, 1990

[30] Foreign Application Priority Data

Feb. 22, 1989 [JP] Japan .................................. 1-40380

[51] Int. Cl.$^5$ ............................................. F02M 35/10
[52] U.S. Cl. ............................................ 123/52 MC
[58] Field of Search .......... 123/52 M, 52 MV, 52 MB, 123/52 MC, 52 MF, 306, 432, 431

[56] References Cited

U.S. PATENT DOCUMENTS

| | | | |
|---|---|---|---|
| 4,615,324 | 10/1986 | Choushi et al. | 123/52 MV |
| 4,708,097 | 11/1987 | Hatamura et al. | 123/52 MV |
| 4,727,829 | 3/1988 | Kondo et al. | 123/52 MB |
| 4,765,285 | 8/1988 | Kobayashi | 123/52 MB |
| 4,821,684 | 4/1989 | Tasaka | 123/52 MV |

Primary Examiner—David A. Okonsky
Attorney, Agent, or Firm—Ernest A. Beutler

[57] ABSTRACT

Several embodiments of engine and induction systems wherein the engine is positioned transversely in the engine compartment and the intake ports of the engine face rearwardly and are served by individual runners that extend across the top of the engine in the opposite direction from the way the intake ports face. The engine is inclined forwardly from the vertical so as to provide adequate height between the cylinder head and the runners and a plenum tank associated with it so as to prevent heating of the induction system.

16 Claims, 5 Drawing Sheets

INTAKE SYSTEM FOR AUTOMOTIVE ENGINE

BACKGROUND OF THE INVENTION

This invention relates to an intake system for an automotive engine and more particularly to an improved high efficiency intake system for such engines.

As is well known, the induction system for an internal combustion engine is very important in determining the performance of the engine. Recently it has been acknowledged that the performance of the engine, at least under some running conditions, can be improved by providing relatively long intake runners that serve the individual ports of the engine. However, in many automotive applications, the use of such long intake runners can give rise to certain problems.

Specifically, a common orientation in modern automotive engine practice is to place the engine transversely in the engine compartment. Such transverse engine placements are employed both in front and rear wheel drive vehicles. However, where the engine is positioned transversely in the engine compartment, it becomes difficult to adequately lengthen the runners of the individual chambers.

One way that the intake runners can be extended is by having them extend from the intake ports and at least in part across the top of the engine toward the opposite side from which the intake ports emanate. Where this is done, however, the intake system tends to lie over a hot portion of the engine such as the cylinder head. As the induction system becomes heated, its efficiency obviously deteriorates as does the performance of the associated engine.

In addition to incorporating long intake runners, it has also been found desirable to position at least one plenum chamber in the induction system. This plenum chamber can most advantageously be positioned at the inlet end to the individual runners. This means that the plenum chamber must either be located over the cylinder head of the engine or, even in extreme cases, over the opposite side of the engine from which the intake ports emanate. When the engine employs a cross flow cylinder head, this means that the plenum chamber will be positioned over the exhaust manifold. Thus the problem of heat transfer to the induction system is even further aggravated.

It may appear that the solution to the aforenoted problem is to increase the distance between the cylinder head and the overlying intake manifold. However, with the emphasis toward lower hood lines to improve aerodynamic efficiency of motor vehicles, it is not possible to raise the intake manifold sufficiently to avoid the aforenoted deleterious effects of heat transfer from the cylinder head and/or exhaust manifold.

It is, therefore, a principal object of this invention to provide an improved induction system for an internal combustion engine.

It is a further object of this invention to provide an improved induction system for an automotive engine wherein long intake runners can be employed but wherein the induction system will not experience undue heating.

It is a further object of this invention to provide an automotive induction system wherein the intake runners may be tuned adequately to improve performance and, at the same time, the runners and their associated plenum chamber will not be disposed close to highly heated portions of the engine.

SUMMARY OF THE INVENTION

This invention is adapted to be embodied in an internal combustion engine that is disposed transversely in an engine compartment. A plurality of cylinders lying in a bank each have at least one intake port facing in the same direction in the engine compartment. A plurality of manifold runners each extend from a respective one of the intake ports and in an opposite direction in the engine compartment so as to lie at least in part over the engine bank. The bank is disposed at an inclined angle from a vertical plane in the engine compartment in the other direction so as to increase the spacing between the cylinder bank and the manifold runners.

DETAILED DESCRIPTION OF THE PREFERRED EMBODIMENTS OF THE INVENTION

Figure 1:
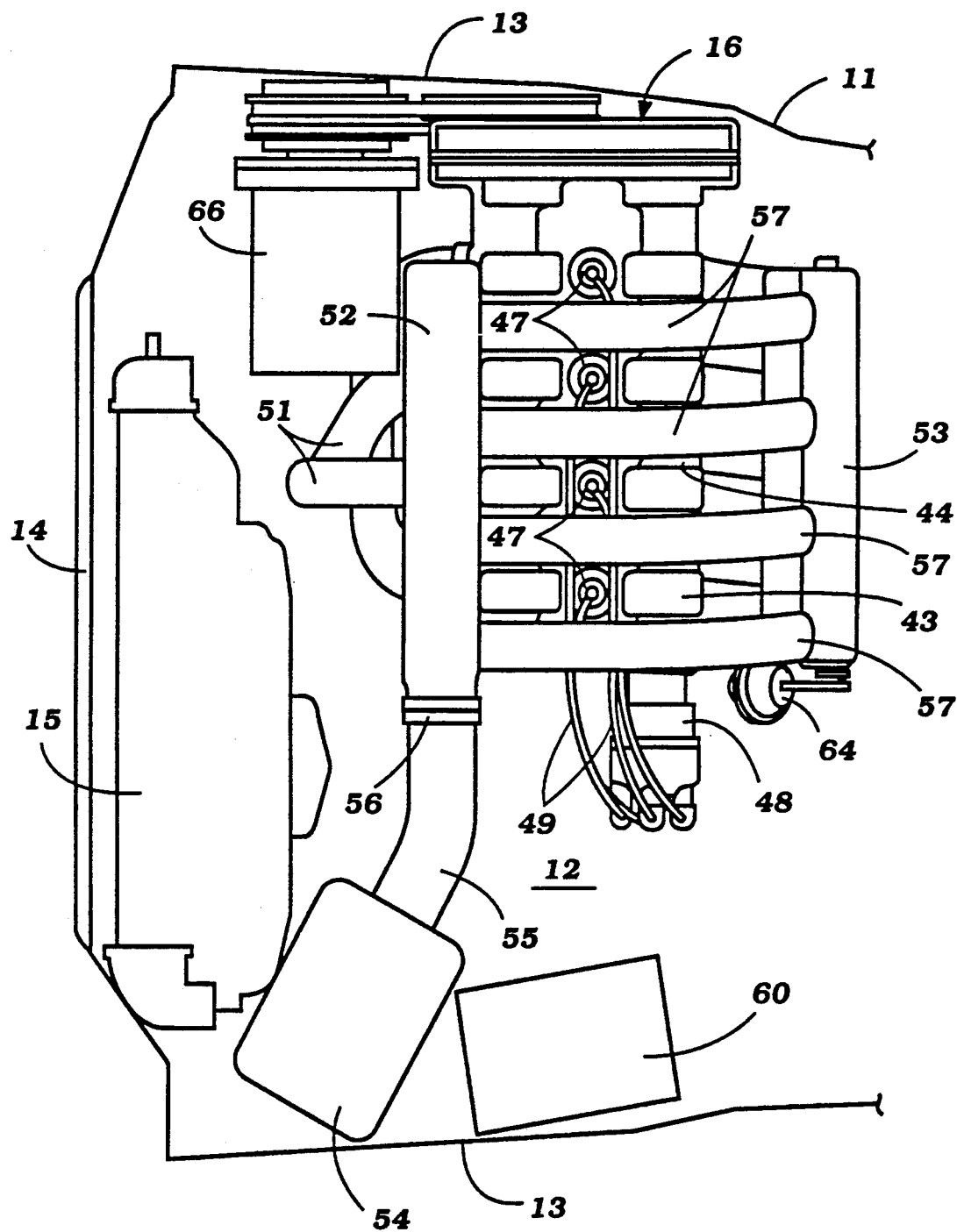
FIG. 1 is a top plan view of a portion of a motor vehicle powered by an internal combustion engine constructed in accordance with an embodiment of the invention. The engine compartment is depicted with the hood removed.

Referring first in detail to FIG. 1, a motor vehicle powered by an internal combustion engine having an induction system constructed in accordance with an embodiment of the invention is identified generally by the reference numeral 11. Only the forward portion of the vehicle 11 is shown and specifically the engine compartment 12 that is defined by a pair of fender aprons 13 and a front grille opening 14 behind which a cooling radiator 15 is positioned. The hod is removed in FIG. 1 to more clearly show the construction.

An internal combustion engine, constructed in accordance with an embodiment of the invention is identified generally by the reference numeral 16 and, in the illustrated embodiment, comprises a four cylinder in line engine that is positioned transversely across the engine compartment 12. The engine 16 drives the front wheels (not shown) of the vehicle 11 through a suitable transmission and differential mechanism as is well known in this art.

Figure 2:
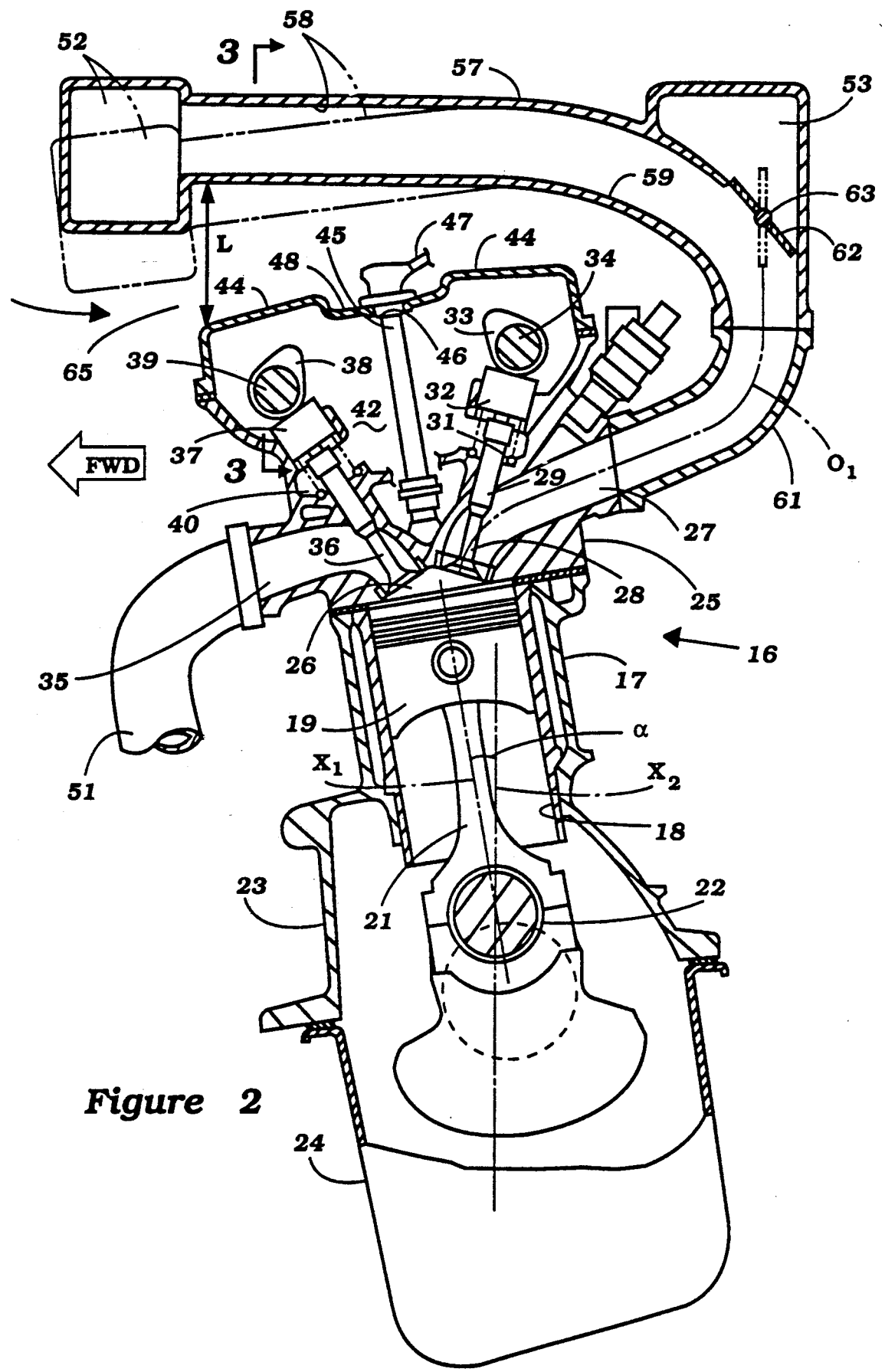
FIG. 2 is an enlarged cross sectional view taken through one of the cylinders of the engine.
Figure 3:
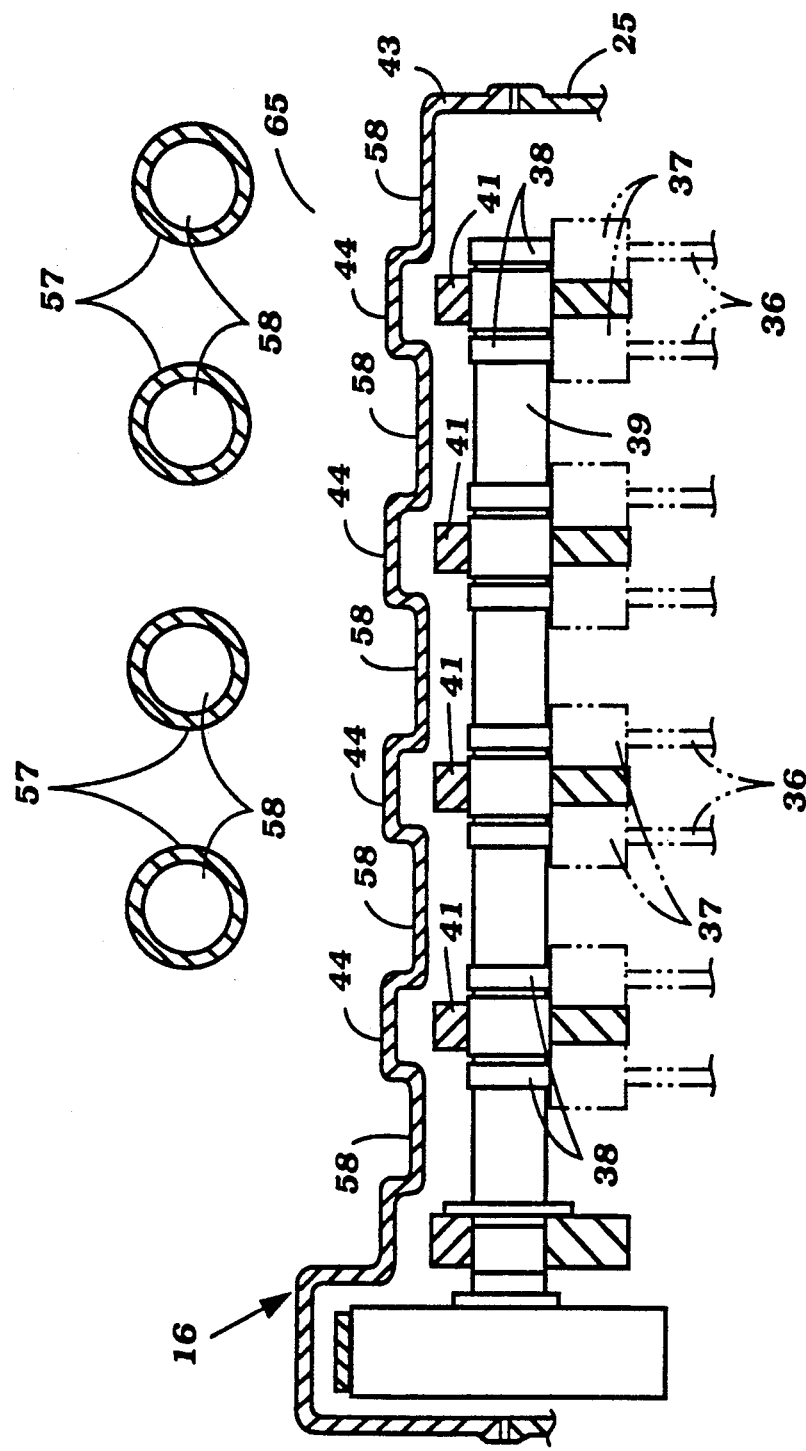
FIG. 3 is a cross sectional view taken in the direction of the line 3—3 in FIG. 2.
Figure 4:
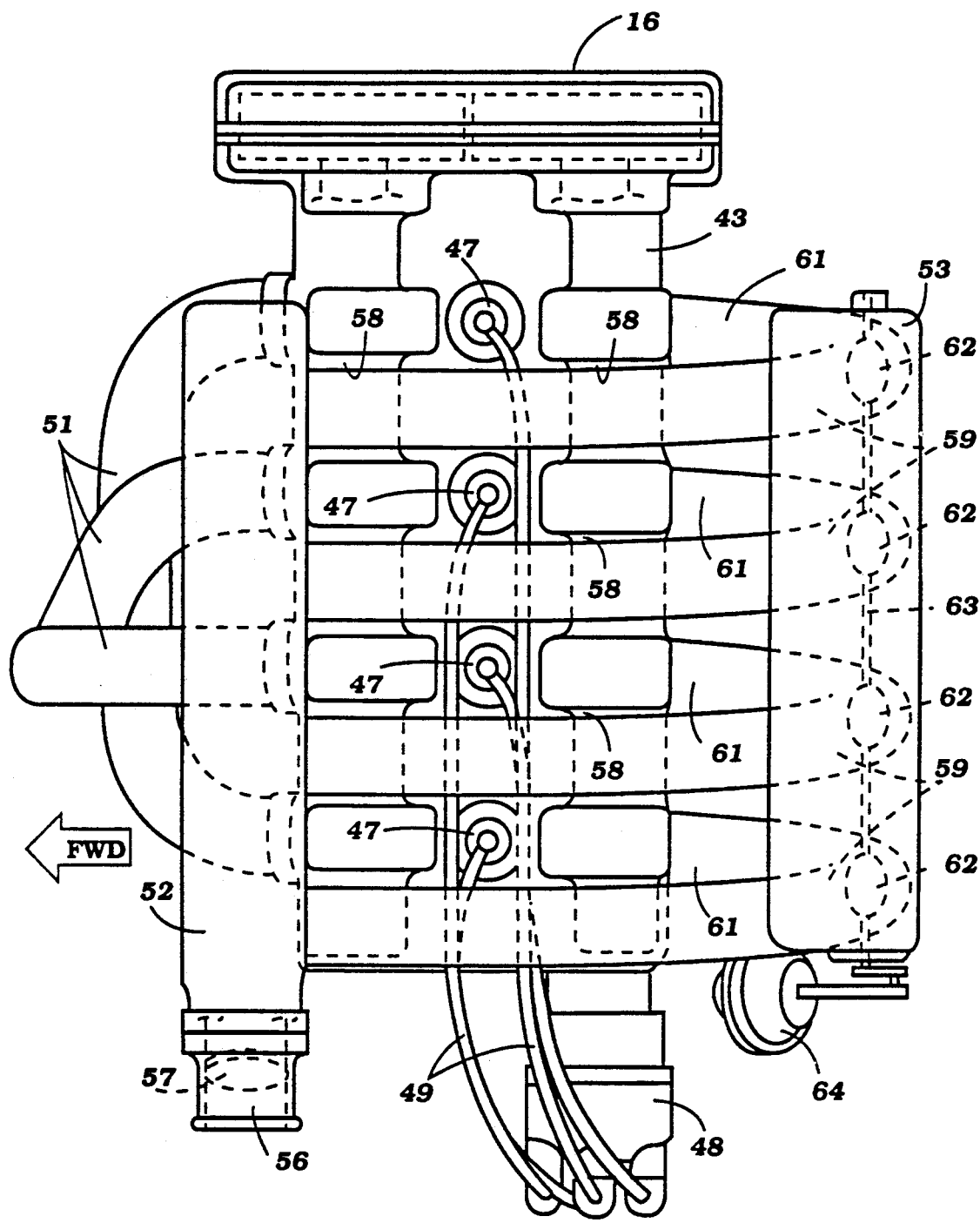
FIG. 4 is a top plan view of the engine.

Referring now additionally to FIGS. 2 through 4, the engine 16, as has been previously noted, is of the four cylinder in line type. To this end, a cylinder block 17 is provided with four aligned cylinder bores 18 in which pistons 19 reciprocate. The pistons 19 are connected by means of connecting rods 21 to individual throws of a crankshaft 22 for driving the crankshaft as is well known. The crankshaft 22 is journaled for rotation within a crankcase chamber defined by a skirt 23 of the cylinder block 17 to which a crankcase or oil pan 24 is affixed in a known manner.

A cylinder head assembly 25 is affixed to the cylinder block 17 in a known manner and has individual combustion chamber recesses 26 that cooperate with the cylinder bores 18 and pistons 19 to form the combustion chambers of the engine. A plurality of intake ports 27, in the illustrated embodiment, one for each combustion chamber 26, extend through the rear face of the cylinder head 25 and terminate at the combustion chambers 26. Poppet type intake valves 28 are slidably supported by guides 29 in the cylinder head 25 and are urged toward their closed positions by means of coil compression springs 31. Thimble tappets 32 are slidably supported in the cylinder head assembly 25 and are operated by the lobes 33 of an intake camshaft 34. The camshaft 34 is journaled for rotation in the cylinder head assembly 25 in a manner which will be described.

Exhaust ports 35 extend through the cylinder head assembly 25 from the combustion chambers 26 to the forward side of the cylinder head assembly 25. As a result, a cross flow cylinder head assembly is provided. Exhaust valves 36 control the opening and closing of the exhaust ports 35 and are urged toward their closed position by coil compression springs 40. Tappet assemblies 37 are slidably supported in the cylinder head assembly 25 and are operated by the lobes 38 of an exhaust camshaft 39. As may be seen in FIG. 3, the exhaust camshaft 39 is journaled for rotation by means including bearing caps 41. The rotational support for the intake camshaft 34 is of the same nature.

In the illustrated embodiment, there are provided four valves per cylinder. That is, there are two intake valves 28 for each cylinder and two exhaust valves 36 for each cylinder. However, the intake ports 27 and the exhaust ports 35 are siamese. That is, the intake and exhaust ports 27 and 35 each emanate from a single passageway formed in the respective intake and exhaust side of the cylinder head assembly 25 and then diverge to the individual seats associated with the intake and exhaust valves 28 and 36. Of course, the invention can be utilized in conjunction with engines having different numbers of valves per cylinder.

The valve train as thus far described is contained within a cavity or valve chamber 42 that is formed at the top of the cylinder head assembly 25 and which is closed by a cam cover 43 that is affixed to the cylinder head assembly 25 in a known manner. The cam cover 43 is provided with protrusions 44 adjacent the bearing caps 41 which protrusions overlie the bearing caps 41 so as to provide a clearance area.

Spark plugs 45 are mounted in the cylinder head assembly 25 and are accessible through openings 46 in the cam cover 43. Respective terminals 47 are affixed to the tips of the spark plug and are fired from a distributor 48 (FIGS. 1 and 4) that is located at one end of the engine and which may be driven from the intake camshaft 34 in a suitable manner. Spark leads 49 extend from this distributor 48 to the individual spark plug terminals 47.

An exhaust manifold 51 is affixed to the exhaust or forward side of the cylinder head assembly 25 and conveys the exhaust gases to the atmosphere through an appropriate exhaust system (not shown).

The engine 16 is also supplied with an induction system for delivering a fuel/air charge to the individual intake ports 27 of the cylinder head assembly 25 for delivery to the combustion chambers 26. This induction system includes a first plenum chamber 52 that extends generally along the length of the engine over the exhaust manifold 31 on the exhaust side of the cylinder head assembly 25. There is further provided a second plenum chamber 53 which also extends along the length of the engine 16 but which is positioned on the intake side of the cylinder head assembly 25.

As will be described, the plenum chamber 51 and the runners associated with it are designed so as to primarily improve low and midrange performance. The plenum chamber 53, on the other hand, is designed so as to improve high speed performance.

Air is delivered from the atmosphere to each of the plenum chambers from an air cleaner silencer assembly 54 (FIG. 1) that is positioned in the engine compartment 12 immediately ahead of a battery 60. A short connecting pipe 55 connects the intake device 54 with a throttle body 56 in which a manually operated throttle valve 57 is positioned for controlling the speed of the engine. Air from the plenum chamber 52 is delivered to the plenum chamber 53 through the induction system which will now be described.

A plurality of generally horizontally extending runner pipes 57, one for each cylinder, extend transversely across the cylinder head assembly 25 from the plenum chamber 52 toward the plenum chamber 53. These runners 57 define individual passageways 58 that will supply air from the induction system as thus far described and specifically from the plenum chamber 52 to the individual cylinders of the engine. These runners extend through recesses 58 formed in the cam cover assembly 43 between the protuberances 44 and specifically at locations that are spaced from the spark plugs 57.

As may be best seen in FIG. 2, the runners 57 have a reentrantly curved portion 59 which merges into a manifold section 61 that is attached to the cylinder head and which communicates with its intake ports 27. As a result of this configuration, there is a relatively long intake path provided from the plenum chamber 52 through the runners 57, their portions 59 and the manifold 61 which can be tuned to provide good induction efficiency at low and medium speeds.

The plenum chamber 53 also communicates with the reentrant sections 59 and manifold 61. However, a throttle valve assembly comprised of a plurality of individual throttle valves 62 supported on a throttle valve shaft 63 controls the communication of the plenum chamber 53 with the intake ports 27. A suitable load responsive device such as a vacuum motor 64 (FIGS. 1 and 4) controls the opening and closing of the control valves 62. The operation is such that the valves 62 are maintained in a closed position at low and midrange performance and are opened at high speed. The length of the passages downstream of the valve 62 that communicate the plenum chamber 53 with the combustion chambers 26 is tuned so as to provide good high speed performance. As a result, the described induction system provides good performance under all running conditions and high output can be achieved without sacrificing midrange or low speed performance.

It should be readily apparent that since the induction system or at least a portion of it extends over the cylinder head assembly 25 that there is a danger of heating of the intake system. However, in order to avoid this and provide a good cooling arrangement for the induction system without necessitating a high hood line, the axis of the cylinder bores $X_1$ is canted forwardly or toward to the exhaust side of the engine through an angle from a vertical plane $X_2$. As a result, this causes the plenum chamber 52 and a major portion of the length of the passages 58 to be positioned at a good height L above the cylinder head and cam cover 43 as clearly shown in FIG. 3. This provides an air gap 65 through which cooling air may flow so as to further cool the induction system. Also, because of the fact that the runners 57 are spaced from each other, this air flow can further be promoted with the air entering through the grille opening 14 of the engine compartment 12.

In addition to the components as thus far described, various accessories may be driven from the camshaft drive of the engine such a generator, alternator, air conditioning compressor or power steering pump, indicated by the reference numeral 66.

Figure 5:
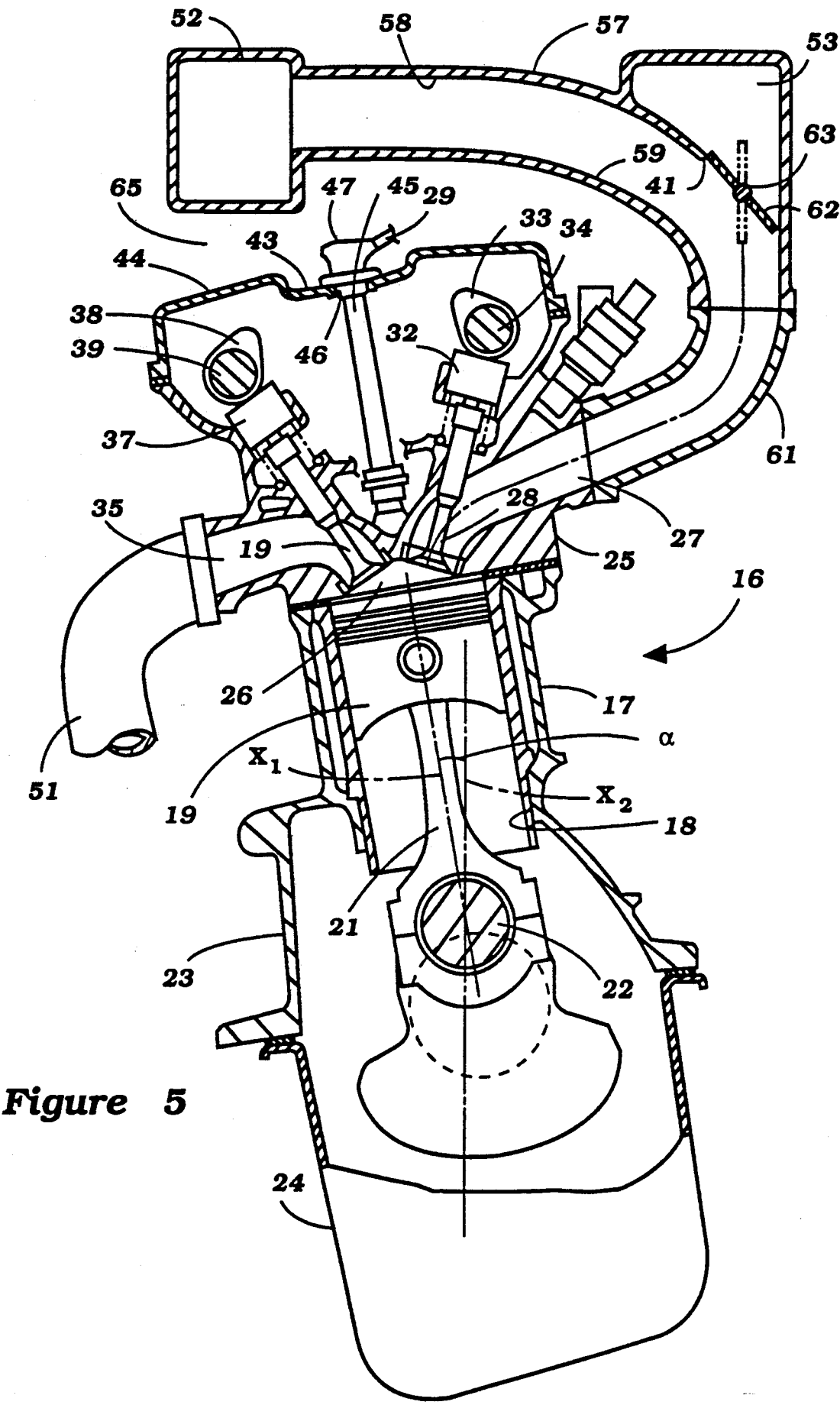
FIG. 5 is a cross sectional view, in part similar to FIG. 2, and shows another embodiment of the invention.

In the embodiment of the invention described, the plenum chamber 52 has extended over beyond the cylinder head assembly 25 and was positioned over the exhaust manifold 51. Of course, if the construction of the engine is such that different length runners are required, the plenum chamber 52 may be provided at other alternative locations. For example, and as shown in FIG. 5, the plenum chamber 52 may be positioned over the exhaust camshaft 39. Because of the similarity of this embodiment to the previously described embodiment, except for the difference just noted, all components of this embodiment have been identified by the same reference numerals as those of the preceding embodiment.

It should be readily apparent from the foregoing description that the described embodiments provide a very compact induction system and permit a low hood line but nevertheless achieve good performance throughout the entire speed and load ranges of the engine. In addition, the construction is such that the induction efficiency will not be deteriorated due to any heating of the induction system, even though one of the plenum chambers and a portion of the intake runners lie over the cylinder head and, in one embodiment, the plenum chamber lies over the exhaust manifold. Of course, the foregoing description is only that of preferred embodiments of the invention. Various changes and modifications may be made without departing from the spirit and scope of the invention, as defined by the appended claims.

We claim:

1. An internal combustion engine disposed transversely in an engine compartment having an air flow opening at one end thereof, a plurality of cylinders lying in a cylinder bank, each having at least one intake port facing in the same direction in said engine compartment and away from said air flow opening, and a plurality of manifold runners, each extending from a respective one of said intake ports and in the direction in said engine compartment opposite to that which said intake ports face to be at least in part over said cylinder bank toward said air flow opening, said cylinder bank being inclined from a vertical plane in said engine compartment in said opposite direction to increase the spacing between said cylinder bank and said manifold runners for air flow around said runners.

2. An internal combustion engine as st forth in claim 1 wherein the runners are transversely spaced from each other for permitting air flow through the engine compartment to circulate around the runners.

3. An internal combustion engine as set forth in claim 1 wherein the runners are transversely spaced from each other for permitting air flow through the engine compartment to circulate around the runners.

4. An internal combustion engine as set forth in claim 1 wherein the runners extend from a plenum chamber disposed on the side of the engine compartment where the air flow opening is positioned.

5. An internal combustion engine as set forth in claim 4 wherein the plenum chamber extends over an exhaust manifold positioned on the side of said engine where the air flow opening is positioned.

6. An internal combustion engine as set forth in claim 1 wherein the runners have a horizontally extending portion extending in the opposite direction and a reentrant portion extending from the horizontally extending portion to the intake ports.

7. An internal combustion engine as set forth in claim 6 wherein the runners are transversely spaced from each other for permitting air flow through the engine compartment to circulate around the runners.

8. An internal combustion engine as set forth in claim 7 wherein the runners extend from a plenum chamber disposed on the other side of the engine compartment adjacent the air flow opening and lying above the engine.

9. An internal combustion engine as set forth in claim 4 wherein the plenum chamber lies above the cylinder bank.

10. An internal combustion engine as set forth in claim 9 wherein the runners are transversely spaced from each other for permitting air flow through the engine compartment to circulate around the runners.

11. An internal combustion engine as set forth in claim 4 further including a second plenum chamber communicating with the runners and disposed on the one side of the engine.

12. An internal combustion engine as set forth in claim 11 further including throttle valve means for controlling the communication of the second plenum chamber with the intake passages.

13. An internal combustion engine as set forth in claim 12 wherein the plenum chamber extends over an exhaust manifold positioned on the other side of said engine.

14. An internal combustion engine as set forth in claim 13 wherein the runners are transversely spaced from each other for permitting air flow through the engine compartment to circulate around the runners.

15. An internal combustion engine as set forth in claim 12 wherein the first mentioned plenum chamber lies above the cylinder bank.

16. An internal combustion engine as set forth in claim 15 wherein the runners are transversely spaced from each other for permitting air flow through the engine compartment to circulate around the runners.

* * * * *

UNITED STATES PATENT AND TRADEMARK OFFICE
CERTIFICATE OF CORRECTION

PATENT NO. : 5,007,386
DATED : April 16, 1991
INVENTOR(S) : Washizu, et al It is certified that error appears in the above-identified patent and that said Letters Patent is hereby corrected as shown below:

Column 5, line 58, Claim 2, "st" should be --set--.

Column 6, line 3, Claim 3, "3" should be --4--.

Column 6, line 4, Claim 3, "1" should be --3--.

Column 6, line 7, Claim 4, "4" should be --3--.

Signed and Sealed this

Tenth Day of August, 1993

Attest:

MICHAEL K. KIRK

Attesting Officer

Acting Commissioner of Patents and Trademarks